US012772311B2

(12) United States Patent
Seok et al.

(10) Patent No.: US 12,772,311 B2
(45) Date of Patent: Oct. 20, 2026

(54) UHR MULTI-LINK DIRECT LINK OPERATION IN WIRELESS COMMUNICATIONS

(71) Applicant: MediaTek Inc., Hsinchu City (TW)

(72) Inventors: Yongho Seok, San Jose, CA (US); James Chih-Shi Yee, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 360 days.

(21) Appl. No.: 18/235,011

(22) Filed: Aug. 17, 2023

(65) Prior Publication Data

US 2024/0064834 A1 Feb. 22, 2024

Related U.S. Application Data

(60) Provisional application No. 63/371,882, filed on Aug. 19, 2022.

(51) Int. Cl.
*H04W 76/15* (2018.01)
*H04W 74/0816* (2024.01)

(52) U.S. Cl.
CPC ....... *H04W 76/15* (2018.02); *H04W 74/0816* (2013.01)

(58) Field of Classification Search
CPC . H04W 76/15; H04W 74/0816; H04W 76/14; H04W 84/12
See application file for complete search history.

(56) References Cited

U.S. PATENT DOCUMENTS

2010/0165896 A1* 7/2010 Gong ................ H04W 52/0216 370/311
2021/0007168 A1* 1/2021 Asterjadhi ........ H04W 52/0235
2022/0124856 A1* 4/2022 Patil ....................... H04W 76/15
2023/0337316 A1* 10/2023 Shafin ................... H04W 76/23
2024/0334482 A1* 10/2024 Kim .................. H04W 74/0816
2024/0422674 A1* 12/2024 Ryu ..................... H04W 40/244

FOREIGN PATENT DOCUMENTS

GB 2592931 A 9/2021
GB 2620200 A * 1/2024 ............ H04W 76/15
GB 2620993 A * 1/2024 ............ H04W 76/15
WO WO-2014152853 A2 * 9/2014 ............ H04W 76/14
(Continued)

OTHER PUBLICATIONS

European Patent Office, Extended European Search Report in European Patent Application No. 23192116.4-1215, Feb. 9, 2024.
(Continued)

*Primary Examiner* — Sudesh M. Patidar
(74) *Attorney, Agent, or Firm* — Andy M. Han; Han IP PLLC

(57) ABSTRACT

Various techniques and schemes pertaining to ultra-high reliability (UHR) multi-link direct link operation in wireless communications are described. A first non-access point (non-AP) multi-link device (MLD) establishes multiple links as multi-link direct links with a second non-AP MLD. The first non-AP MLD also maintains a multi-link association with an AP MLD. The first non-AP MLD communicates with the second non-AP MLD over one or more links of the multiple links in a multi-link direct link operation.

16 Claims, 6 Drawing Sheets

(56) References Cited

FOREIGN PATENT DOCUMENTS

| | | | | |
|---|---|---|---|---|
| WO | WO 2014152853 A3 | 9/2014 | | |
| WO | WO 2022124979 A1 | 6/2022 | | |
| WO | WO-2024023041 A1 * | 2/2024 | ............ | H04W 76/14 |

OTHER PUBLICATIONS

Rubayet Shafin (Samsung Research America): "CC36 CR on Broadcast TWT for MLD", IEEE Draft; 11-22-0254-06-00BE-CC36-CR-on-Broadcast-TWT-for-MLD, IEEE-SA Mentor, Piscataway, NJ USA, vol. 802.11 EHT; 802.11be, No. 6, May 16, 2022, pp. 1-13, XP068190648.

* cited by examiner

UHR MULTI-LINK DIRECT LINK OPERATION IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/371,882, filed 19 Aug. 2022, the content of which being herein incorporated by reference in its entirety.

TECHNICAL FIELD

The present disclosure is generally related to wireless communications and, more particularly, to ultra-high reliability (UHR) multi-link direct link operation in wireless communications.

BACKGROUND

Unless otherwise indicated herein, approaches described in this section are not prior art to the claims listed below and are not admitted as prior art by inclusion in this section.

In a wireless local area network (WLAN) according to current Institute of Electrical and Electronics Engineers (IEEE) 802.11 specifications, a non-access point (non-AP) multi-link device (MLD) can establish one or more multi-link direct links with a peer non-AP MLD. One or more of the established multi-link direct links can use an off-channel different than an operating channel of one or more access points (APs) affiliated with an AP MLD with which the non-AP MLD is/are associated. However, at present time, details on UHR multi-link direct link operations has yet to be defined. Therefore, there is a need for a solution of UHR multi-link direct link operation in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to UHR multi-link direct link operation in wireless communications. It is believed that, under various proposed schemes in accordance with the present disclosure, issue(s) described herein may be addressed.

In one aspect, a method may involve a first non-access point (non-AP) multi-link device (MLD) establishing multiple links as multi-link direct links with a second non-AP MLD. The method may also involve the first non-AP MLD maintaining a multi-link association with an AP MLD. The method may further involve the first non-AP MLD communicating with the second non-AP MLD over one or more links of the multiple links in a multi-link direct link operation (e.g., UHR multi-link direct link operation).

In another aspect, a method may involve an AP MLD establishing multiple links as a multi-link association with a first non-AP MLD and a second non-AP MLD. The method may also involve the AP MLD communicating with the first non-AP MLD and the second non-AP MLD over one or more links of the multiple links in a multi-link direct link operation (e.g., UHR multi-link direct link operation).

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UHR multi-link direct link operation in wireless communications. According to the present disclosure, a number of possible solutions may be implemented separately or jointly. That is, although these possible solutions may be described below separately, two or more of these possible solutions may be implemented in one combination or another.

Figure 1:
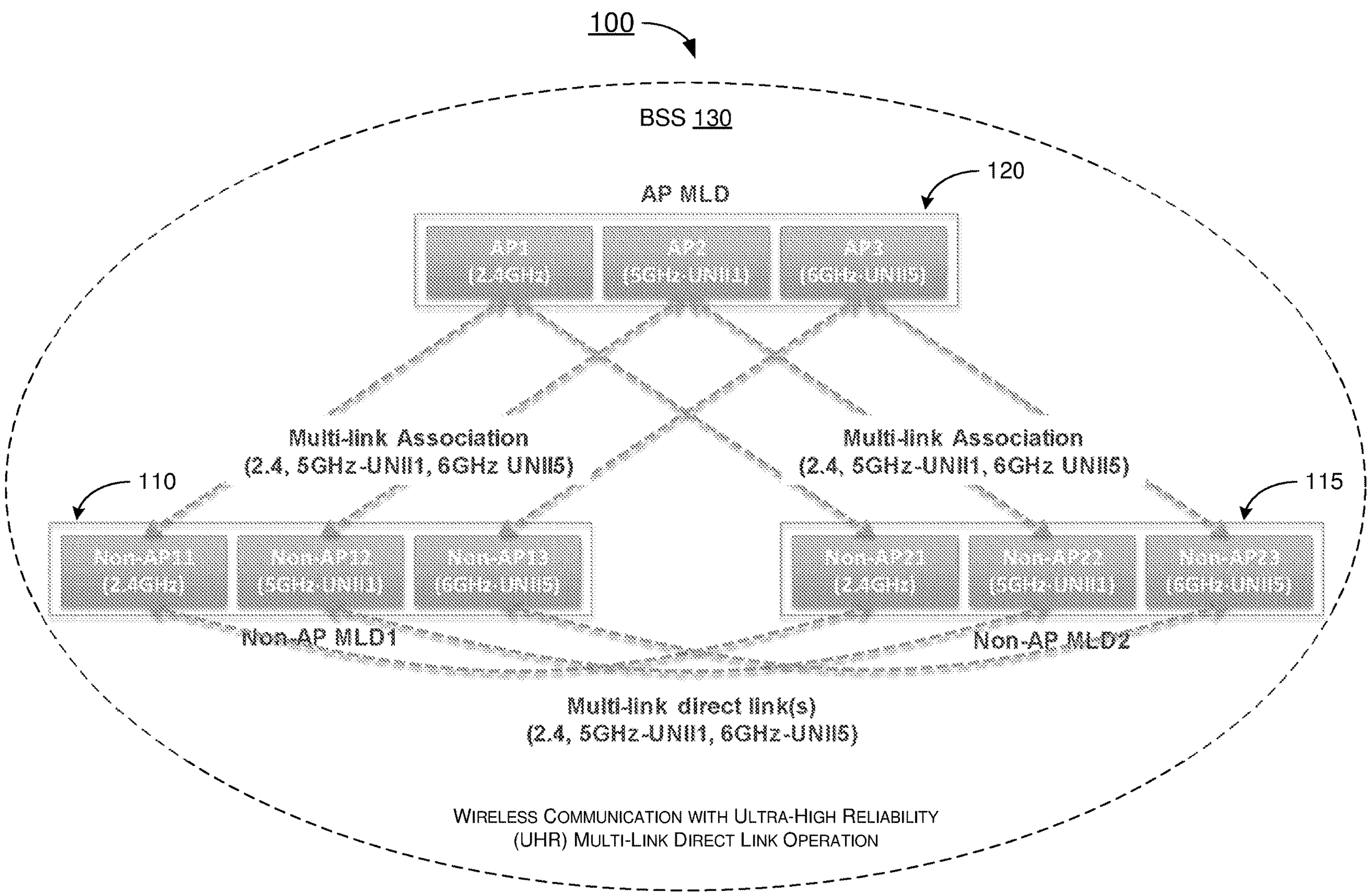
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve at least a first non-AP MLD, or MLD 110, a second non-AP MLD, or MLD 115, and an AP MLD, or MLD 120, communicating wirelessly with each other in a basic service set (BSS) 130 in accordance with one or more IEEE 802.11 standards (e.g., IEEE 802.11be and beyond). Each STA of multiple STAs affiliated with MLD 110 may function as a non-AP STA, each STA of multiple STAs affiliated with MLD 115 may also function as a non-AP STA, and each STA of multiple STAs affiliated with MLD 120 may function as an AP STA. For simplicity and illustrative purposes without limiting the scope of the present disclosure, in FIG. 1, MLD 110 is shown to be affiliated with three non-AP STAs ("non-AP11", "non-AP12" and "non-AP13" affiliated therewith), MLD 115 is shown to be affiliated with three non-AP STAs ("non-AP21", "non-AP22" and "non-AP23" affiliated therewith), and MLD 120 is shown to be affiliated with three APs ("AP1", "AP2" and "AP3" affiliated therewith), although in actual implementations the number of affiliated STAs/APs may be the same different (e.g., two instead of three).

Moreover, each STA/AP affiliated with MLD 110, MLD 115 and MLD 120 may operate on a respective channel or frequency. For simplicity and illustrative purposes without limiting the scope of the present disclosure, in FIG. 1, non-AP11, non-AP12 and non-AP13 affiliated with MLD 110 are shown to operate on 2.4 GHz, 5 GHz in the Unlicensed National Information Infrastructure (UNII) frequency range 1 (5 GHz-UNII1) and 6 GHz in the UNII frequency range 5 (6 GHz-UNII5), respectively, non-AP21, non-AP22 and non-AP23 affiliated with MLD 115 are shown to operate on 2.4 GHz, 5 GHz-UNII1 and 6 GHz-UNII5, respectively, and AP1, AP2 and AP3 affiliated with MLD 120 are shown to operate on 2.4 GHz, 5 GHz-UNII1 and 6 GHz-UNII5, respectively. As shown in FIG. 1, there may be multi-link direct link(s) established between one or more of non-AP11, non-AP12 and non-AP13 affiliated with MLD 110 and one or more of non-AP21, non-AP22 and non-AP23 affiliated with MLD 115 over one or more of the 2.4 GHz, 5 GHz-UNII1 and 6 GHz-UNII5 frequency ranges. In addition, as shown in FIG. 1, there may be multi-link association between non-AP11, non-AP12 and non-AP13 affiliated with MLD 110 and AP1, AP2 and AP3 affiliated with MLD 120 over of the 2.4 GHz, 5 GHz-UNII1 and 6 GHz-UNII5 frequency ranges, and there may be multi-link association between non-AP21, non-AP22 and non-AP23 affiliated with MLD 115 and AP1, AP2 and AP3 affiliated with MLD 120 over of the 2.4 GHz, 5 GHz-UNII1 and 6 GHz-UNII5 frequency ranges. One or more of the multiple links established for multi-link direct link operation may be utilized to transmit and receipt physical-layer protocol data units (PPDUs) among MLD 110, MLD 115 and MLD 120. There is no limitation or restriction on the communications between any two of MLD 110, MLD 115 and MLD 120.

Each of MLD 110, MLD 115 and MLD 120 may be configured to utilize various schemes of UHR multi-link direct link operation in wireless communications in accordance with various proposed schemes, as described below. It is noteworthy that, while the various proposed schemes may be individually or separately described below, in actual implementations each of the proposed schemes may be utilized individually or separately. Alternatively, some or all of the proposed schemes may be utilized jointly.

Under a proposed scheme in accordance with the present disclosure, during a multi-link direct link setup, a non-AP MLD (e.g., MLD 110) may negotiate a primary multi-link direct link with a peer non-AP MLD (e.g., MLD 115). The primary multi-link direct link may be the link among multiple links established for multi-link direct link operation between the two non-AP MLDs that is in an active state. After successful multi-link direct link setup, one or more other multi-link direct links among the multiple links established between the two non-AP MLDs may be in a doze state in a power-save mode by default, except for the negotiated primary multi-link direct link.

Under a proposed scheme in accordance with the present disclosure, a non-AP MLD (e.g., MLD 110) may request to a peer non-AP MLD (e.g., MLD 115) to enable one or more other multi-link direct links (e.g., one or more of the multiple links other than the primary multi-link direct link). When the peer non-AP MLD accepts the request, the peer non-AP MLD may respond with a confirmation frame. For instance, the request may be transmitted in or as a Target Wake Time (TWT) Setup Request frame, and the confirmation may be transmitted in or as a TWT Setup Response frame. Accordingly, other multi-link direct link(s) may be enabled (e.g., switched to an active state) only during one or more negotiated TWT service periods (SPs). The enabled link(s) may return to the doze state during other periods of time, so as to preserve power or otherwise minimize power consumption. Moreover, the non-AP MLD may provide the negotiated TWT SP(s) for the multi-link direct link to the AP MLD. Then, the AP MLD may not transmit a medium access control (MAC) protocol data unit (MPDU) to the non-AP MLD when the non-AP MLD operates during the negotiated TWT SP(s).

Under a proposed scheme in accordance with the present disclosure, when one or more multi-link off-channel direct links are established, in an event that one or more non-AP STAs operating on the multi-link direct link(s) has/have an association with one or more APs, each of the non-AP STA(s) may cause each corresponding link(s) to enter into a doze state in a power-save mode for an associated AP.

Under a proposed scheme in accordance with the present disclosure, with respect to Enhanced Multi-Link Single-Radio (EMLSR) operations on multi-link direct links, an AP MLD may need to recognize the non-AP MLD(s) that enabled an EMLSR mode on one or more multi-link direct links. Under the proposed scheme, a non-AP MLD (e.g., MLD 110 or MLD 115) may signal to an AP MLD (e.g., MLD 120) when the EMLSR mode is enabled on one or more multi-link direct links. Otherwise, a non-AP STA operating on one of the one or more multi-link direct links may enter into a doze state in a power-save mode for an associated AP.

Figure 2:
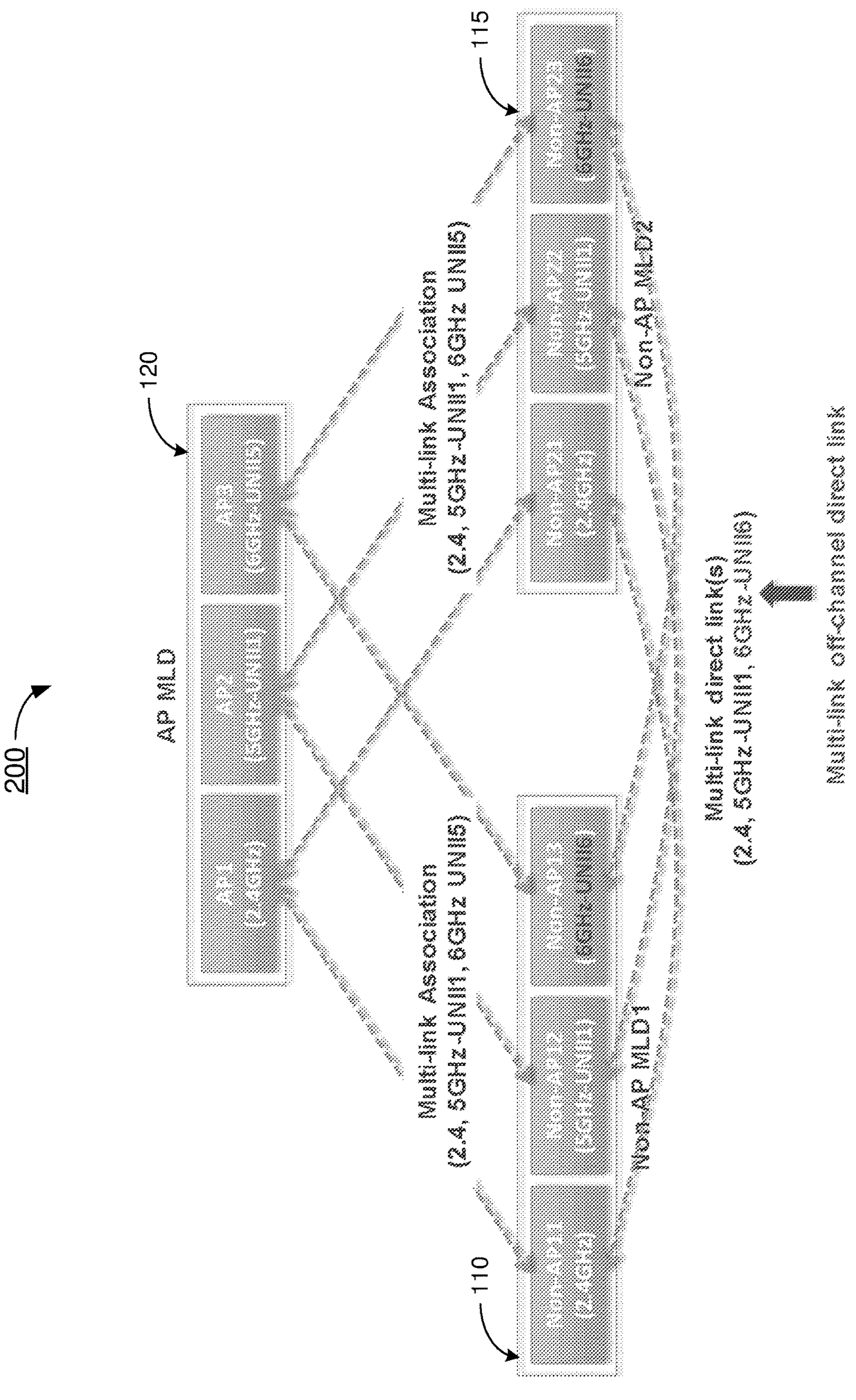
FIG. 2 is a diagram of an example scenario in accordance with an implementation of the present disclosure.

FIG. 2 illustrates an example scenario 200 of UHR multi-link direct link operation in accordance with an implementation of the present disclosure. In scenario 200, there may be multi-link association between non-AP11, non-AP12 and non-AP13 affiliated with MLD 110 and AP1, AP2 and AP3 affiliated with MLD 120 over of the 2.4 GHz, 5

GHz-UNII1 and 6 GHz-UNII5 frequency bands/ranges. Similarly, there may be multi-link association between non-AP21, non-AP22 and non-AP23 affiliated with MLD 115 and AP1, AP2 and AP3 affiliated with MLD 120 over of the 2.4 GHz, 5 GHz-UNII1 and 6 GHz-UNII5 frequency bands/ranges. Yet, different than that shown in FIG. 1, in scenario 200 there may be multi-link direct link(s) established between one or more of non-AP11, non-AP12 and non-AP13 affiliated with MLD 110 and one or more of non-AP21, non-AP22 and non-AP23 affiliated with MLD 115 over one or more of the 2.4 GHz, 5 GHz-UNII1 and 6 GHz in the UNII frequency range 6 (6 GHz-UNII6). Specifically, in scenario 200, the channel on 6 GHz-UNII6 may be utilized by MLD 110 and MLD 115 via non-AP13 and non-AP23 as a multi-link off-channel direct link. In this example, the channel on 2.4 GHz (or 5 GHz-UNII1) may be utilized by MLD 110 and MLD 115 as a primary multi-link direct link to exchange information, such as control information, management frames and so forth, while the channel on 6 GHz-UNII6 may be considered as a multi-link off-channel direct link under the proposed scheme. Correspondingly, MLD 110 may cause the link between non-AP13 and AP3 to enter the doze state, and MLD 115 may cause the link between non-AP23 and AP3 to enter the doze state. The multi-link off-channel direct link may be established and used for exchange of control information or management frame(s) between a non-AP 13 affiliated with MLD 110 and the associated non-AP 23 affiliated with MLD 115.

When any one of the non-AP STAs affiliated with MLD 110 or MLD 115 enables an EMLSR mode on a respective one of the multiple links established for multi-link direct link operation, that non-AP STA may signal to its associated AP affiliated with MLD 120 to inform the associated AP about entering the EMLSR mode. In response, the associated AP may enter into a doze state. For instance, referring to FIG. 2, when non-AP11 affiliated with MLD 110 enables the link on the 2.4 GHz channel for EMLSR operation, non-AP11 may transmit a signal to AP1 affiliated with MLD 120, thereby informing AP1 about non-AP11 operating in the EMLSR mode on the link in 2.4 GHz. Correspondingly, AP1 may enter into the doze state (until being informed later by non-AP11 that it has existed from or ended the EMLSR mode on the 2.4 GHz channel).

Figure 3:
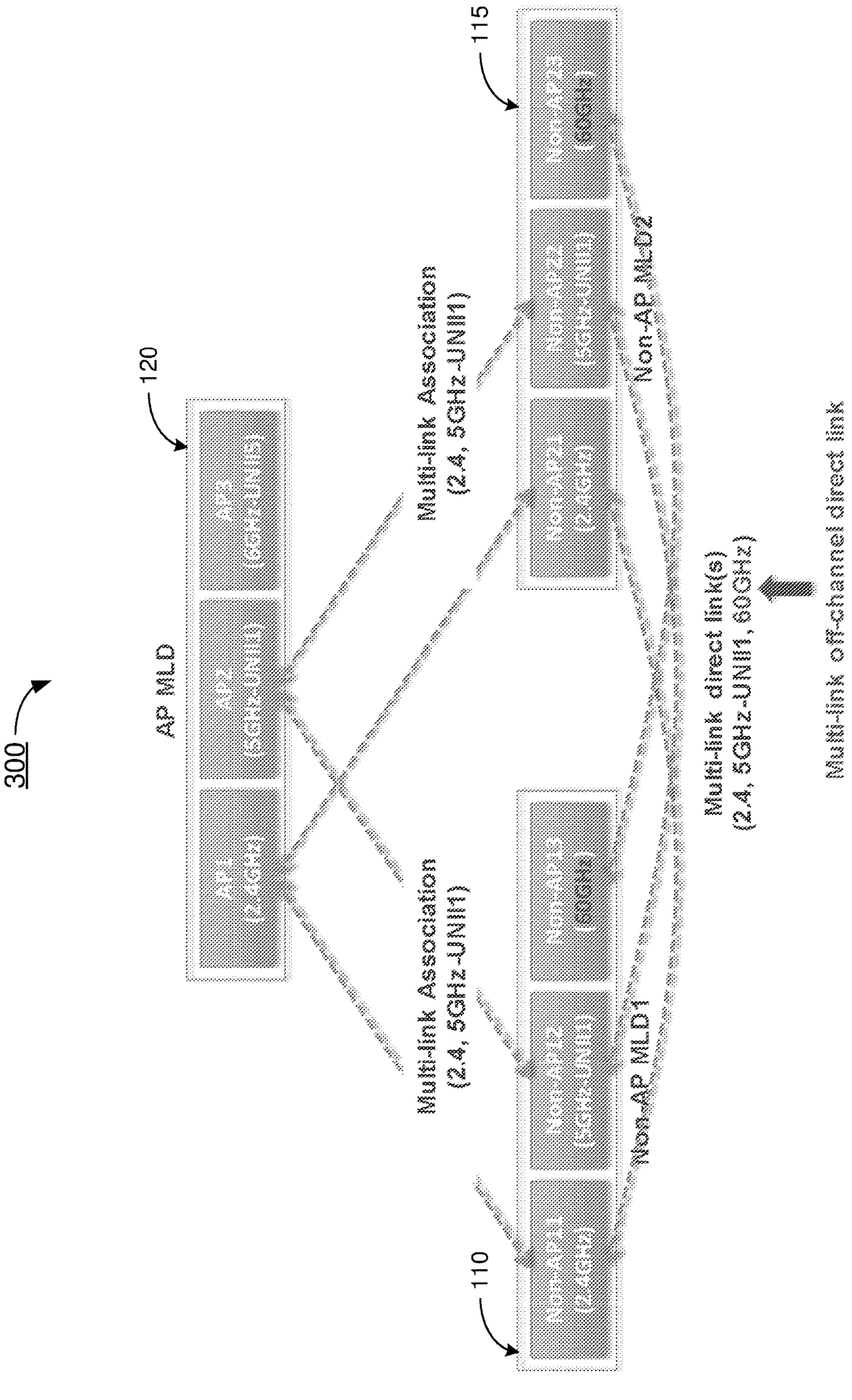
FIG. 3 is a diagram of an example scenario in accordance with an implementation of the present disclosure.

FIG. 3 illustrates an example scenario 300 of UHR multi-link direct link operation in accordance with an implementation of the present disclosure. In scenario 300, there may be multi-link association between non-AP11 and non-AP12 affiliated with MLD 110 and AP1 and AP2 affiliated with MLD 120 over of the 2.4 GHz and 5 GHz-UNII1 frequency bands/ranges. Similarly, there may be multi-link association between non-AP21 and non-AP22 affiliated with MLD 115 and AP1 and AP2 affiliated with MLD 120 over of the 2.4 GHz and 5 GHz-UNII1 frequency bands/ranges. Moreover, different than that shown in FIG. 1, in scenario 300 there may be multi-link direct link(s) established between one or more of non-AP11, non-AP12 and non-AP13 affiliated with MLD 110 and one or more of non-AP21, non-AP22 and non-AP23 affiliated with MLD 115 over one or more of the 2.4 GHz, 5 GHz-UNII1 and 60 GHz frequency bands/ranges. Specifically, in scenario 300, the channel on 60 GHz may be utilized by MLD 110 and MLD 115 via non-AP13 and non-AP23 as a multi-link off-channel direct link. In this example, the channel on 2.4 GHz (or 5 GHz-UNII1) may be utilized by MLD 110 and MLD 115 as a primary multi-link direct link to exchange information, such as control information, management frames and so forth, while the channel on 60 GHz may be considered as the multi-link off-channel direct link under the proposed scheme. Accordingly, AP3 affiliated with MLD 120 may enter a doze state.

Illustrative Implementations

Figure 4:
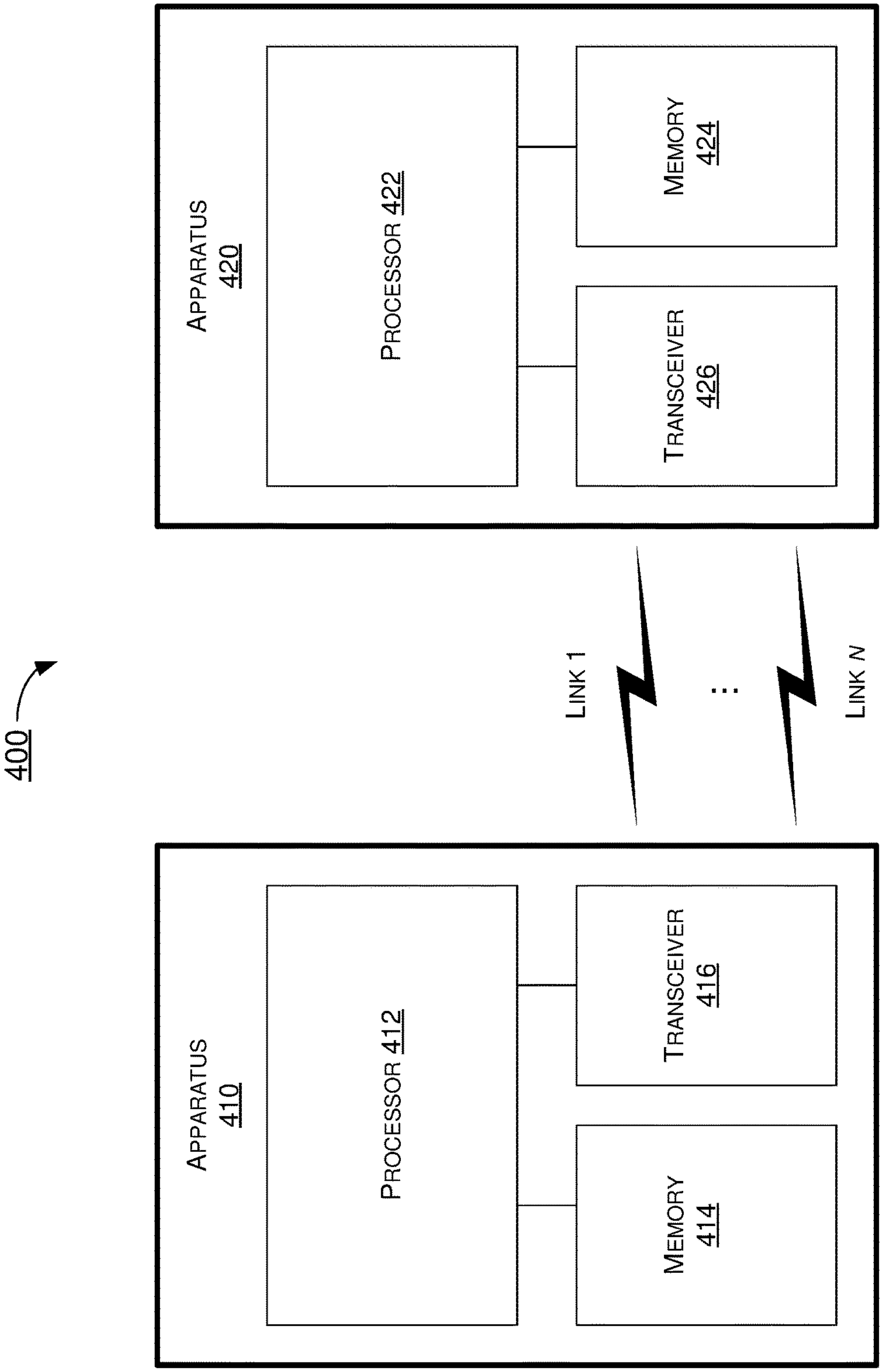
FIG. 4 is a block diagram of an example communication system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to UHR multi-link direct link operation in wireless communications, including the various schemes described above with respect to various proposed designs, concepts, schemes, systems and methods described above as well as processes described below. For instance, apparatus 410 may be an example implementation of MLD 110, MLD 115 or MLD 120, and apparatus 420 may be an example implementation of MLD 110, MLD 115 or 120.

Each of apparatus 410 and apparatus 420 may be a part of an electronic apparatus such as, for example and without limitation, a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in a network node, such as an AP in a WLAN.

In some implementations, each of apparatus 410 and apparatus 420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, one or more RISC processors or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to UHR multi-link direct link operation in wireless communications in accordance with various implementations of the present disclosure.

In some implementations, apparatus 410 may also include a transceiver 416 coupled to processor 412. Transceiver 416 may be capable of wirelessly transmitting and receiving data. In some implementations, apparatus 420 may also include a transceiver 426 coupled to processor 422. Transceiver 426 may include a transceiver capable of wirelessly transmitting and receiving data. Transceiver 416 of apparatus 410 and transceiver 426 of apparatus 420 may wirelessly communicate with each other over one or more of multiple links link 1~link N, with N being a positive integer greater than 1, such as a first link and a second link.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (FeRAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as MLD 110 or MLD 115 which may be a non-AP MLD, and apparatus 420, as MLD 120 which may be an AP MLD, is provided below in the context of example processes 500 and 600. It is noteworthy that, although the example implementations described below are provided in the context of WLAN, the same may be implemented in other types of networks.

Illustrative Processes

Figure 5:
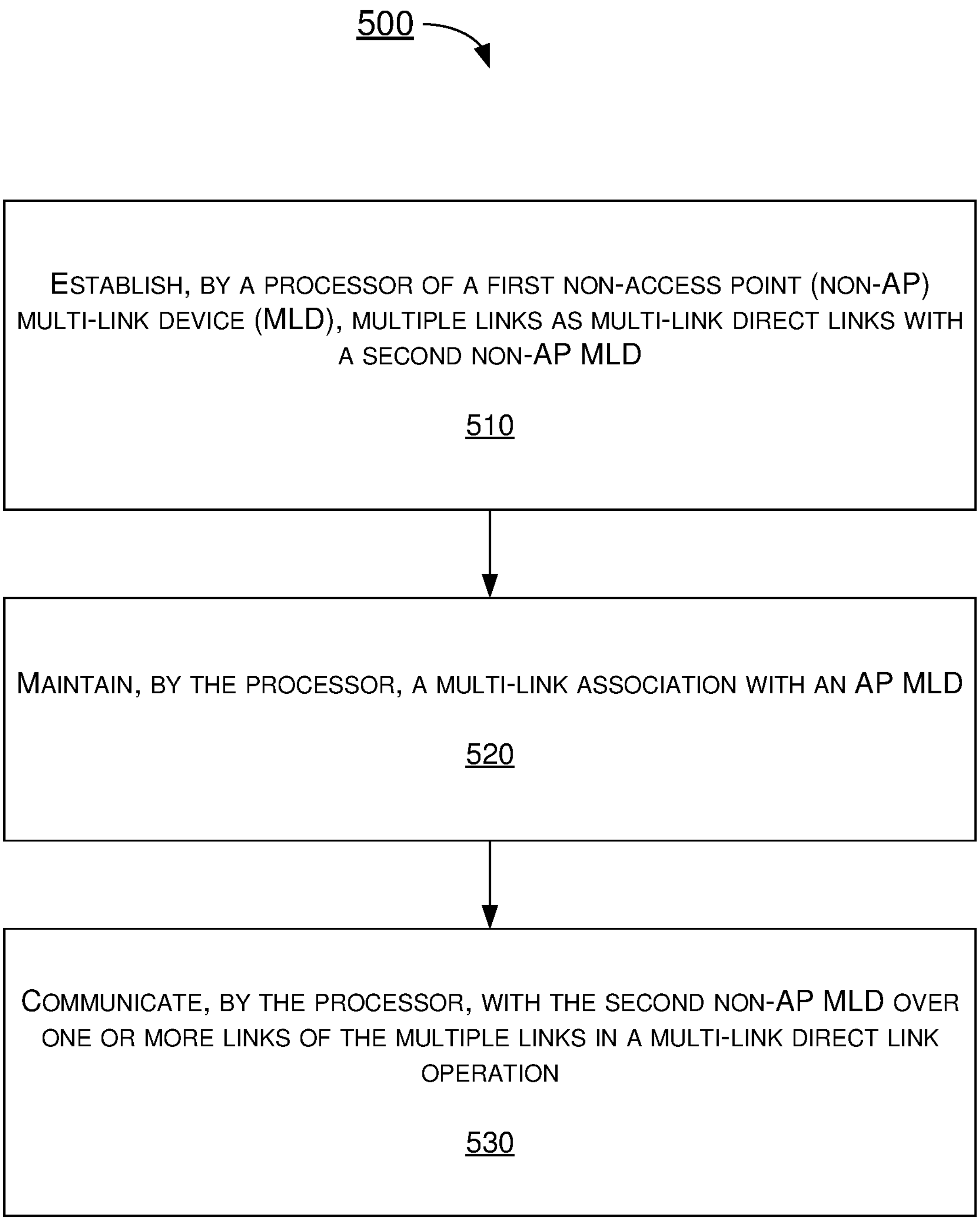
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to UHR multi-link direct link operation in wireless communications in accordance with the present disclosure. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively, in a different order. Furthermore, one or more of the blocks/sub-blocks of process 500 may be executed repeatedly or iteratively. Process 500 may be implemented by or in apparatus 410 and apparatus 420 as well as any variations thereof. Solely for illustrative purposes and without limiting the scope, process 500 is described below in the context of apparatus 410 as MLD 110 or MLD 115 (e.g., a non-AP MLD) and apparatus 420 as MLD 120 (e.g., an AP MLD) of a wireless network such as a WLAN in accordance with one or more of IEEE 802.11 standards. Process 500 may begin at block 510.

At 510, process 500 may involve processor 412 of apparatus 410, as a first non-AP MLD (e.g., MLD 110), establishing, via transceiver 416, multiple links as multi-link direct links with a second non-AP MLD (e.g., MLD 115). Process 500 may proceed from 510 to 520.

At 520, process 500 may involve processor 412 maintaining, via transceiver 416, a multi-link association with an AP MLD (e.g., MLD 120). Process 500 may proceed from 520 to 530.

At 530, process 500 may involve processor 412 communicating, via transceiver 416, with the second non-AP MLD over one or more links of the multiple links in a multi-link direct link operation (e.g., UHR multi-link direct link operation).

In some implementations, in establishing the multiple links, process 500 may involve processor 412 negotiating with the second non-AP MLD to utilize one of the multiple links as a primary multi-link direct link. In such cases, the primary multi-link direct link may be in an active state and one or more other links of the multiple links may be in a doze state.

In some implementations, in communicating with the second non-AP MLD, process 500 may involve processor 412 enabling one or more other links of the multiple links to enter the active state in addition to the primary multi-link direct link.

In some implementations, in enabling the one or more other links of the multiple links, process 500 may involve processor 412 performing certain operations. For instance, process 500 may involve processor 412 transmitting a request to the second non-AP MLD to request to enable the one or more other links. Moreover, process 500 may involve processor 412 receiving a confirmation from the second non-AP MLD. In some implementations, the request may include a TWT Setup Request frame, and the confirmation may include a TWT Setup Response frame. In some implementations, the one or more other links of the multiple links may be enabled during one or more TWT SPs.

In some implementations, in establishing the multiple links, process 500 may involve processor 412 establishing a multi-link off-channel direct link among the multiple links. Moreover, in communicating with the second non-AP MLD, process 500 may involve processor 412 exchanging control information or one or more management frames on the multi-link off-channel direct link between a non-AP STA affiliated with the first non-AP MLD and an associated non-AP STA affiliated with the second non-AP MLD. In some implementations, in establishing the multiple links, process 500 may further involve processor 412 causing a link between the non-AP STA and an associated AP affiliated with the AP MLD to enter a doze state.

In some implementations, in communicating with the second non-AP MLD, process 500 may involve processor 412 performing certain operations. For instance, process 500 may involve processor 412 enabling an EMLSR mode on at least one link of the multiple links established between a non-AP STA affiliated with the first non-AP MLD and an associated non-AP STA affiliated with the second non-AP MLD. Additionally, process 500 may involve processor 412 signaling to the AP MLD regarding the enabling of the EMLSR mode on the at least one link. In some implementations, in enabling the EMLSR mode on the at least one link, process 500 may involve processor 412 causing a link between the non-AP STA and an associated AP affiliated with the AP MLD to enter a doze state.

Figure 6:
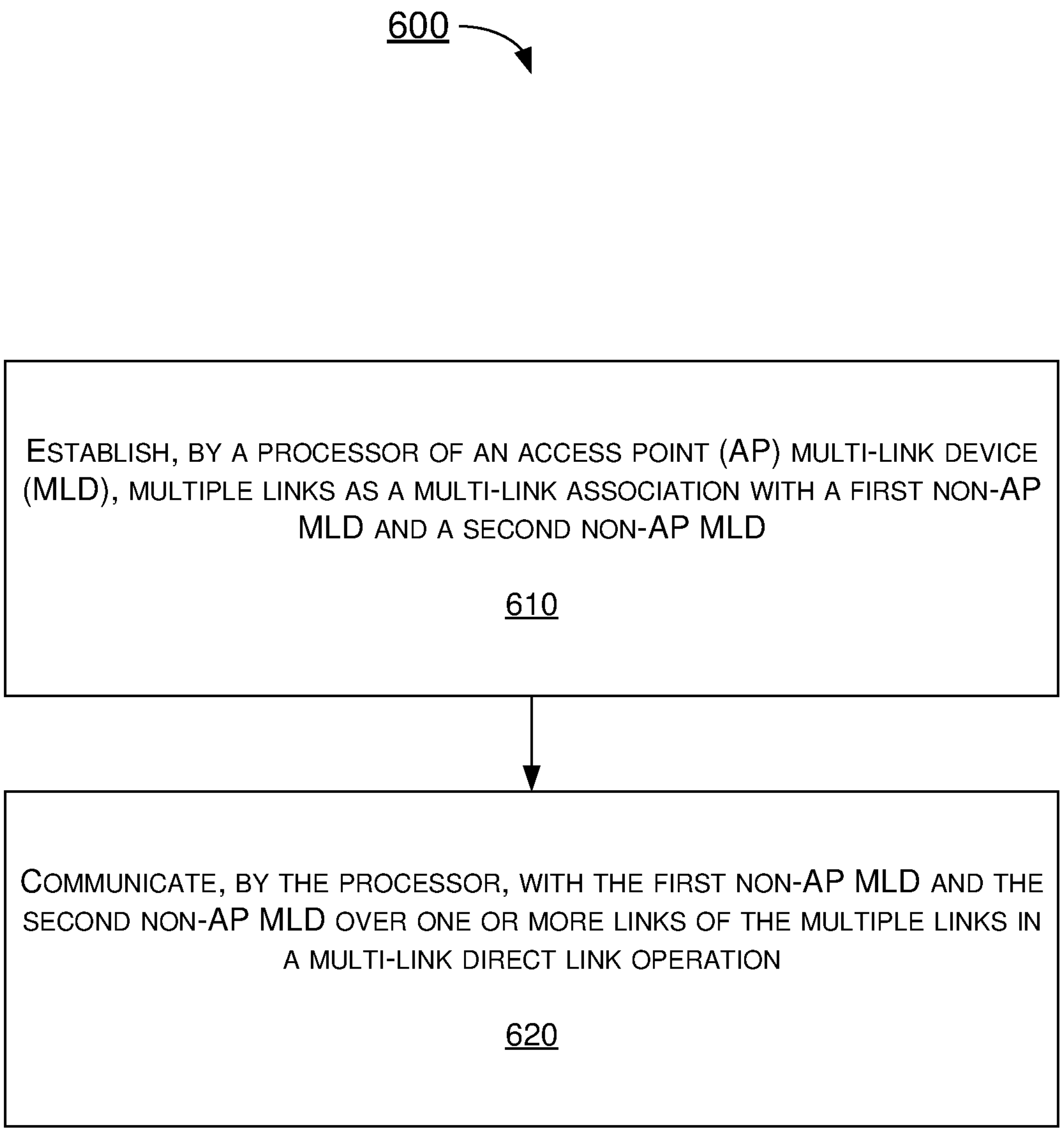
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to UHR multi-link direct link operation in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 410 and apparatus 420 as well as any variations thereof. Solely for illustrative purposes and without limiting the scope, process 600 is described below in the context of apparatus 410 as MLD 110 or MLD 115 (e.g., a non-AP MLD) and apparatus 420 as MLD 120 (e.g., an AP MLD) of a wireless network such as a WLAN in accordance with one or more of IEEE 802.11 standards. Process 600 may begin at block 610.

At 610, process 600 may involve processor 422 of apparatus 420, as an AP MLD (e.g., MLD 120), establishing, via transceiver 426, multiple links as a multi-link association with a first non-AP MLD (e.g., MLD 110) and a second non-AP MLD (e.g., MLD 115). Process 600 may proceed from 610 to 620.

At 620, process 600 may involve processor 422 communicating, via transceiver 426, with the first non-AP MLD and the second non-AP MLD over one or more links of the multiple links in a multi-link direct link operation.

In some implementations, a link among the multiple links between a non-AP STA affiliated with the first non-AP MLD and an associated AP affiliated with the AP MLD may enter a doze state responsive to a multi-link off-channel direct link being established between the non-AP STA and an associated non-AP STA affiliated with the second non-AP MLD.

In some implementations, in communicating, process 600 may involve processor 422 receiving a signaling from the first non-AP MLD regarding enabling an EMLSR mode on at least one link of multiple links established between a non-AP STA affiliated with the first non-AP MLD and an associated non-AP STA affiliated with the second non-AP MLD. In some implementations, a link among the multiple links between the non-AP STA and an associated AP affiliated with the AP MLD may enter a doze state responsive to the enabling of the EMLSR mode on the at least one link between the first non-AP MLD and the second non-AP MLD.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds 'true' for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the 'true' scope and spirit being indicated by the following claims.

What is claimed is:

1. A method, comprising:

establishing, by a processor of a first non-access point (non-AP) multi-link device (MLD), multiple links as multi-link direct links with a second non-AP MLD;

maintaining, by the processor, a multi-link association with an AP MLD; and communicating, by the processor, with the second non-AP MLD over one or more links of the multi-link direct links in a multi-link direct link operation, wherein the multi-link direct links comprise at least:

a first link between a first non-AP station (STA) affiliated with the first non-AP MLD and a first AP affiliated with the AP MLD;

a second link between a second non-AP STA associated with the second non-AP MLD and the first AP affiliated with the AP MLD; and a primary multi-link direct link established between the first non-AP MLD and the second non-AP MLD among the multi-link direct links that is in an active state, and wherein the establishing of the multiple links as the multi-link direct links comprises establishing a multi-link off-channel direct link between the first non-AP STA affiliated with the first non-AP MLD and the second non-AP STA associated with the second non-AP MLD such that the first link and the second link enter a doze state responsive to the establishing of the multi-link off-channel direct link, and wherein the communicating comprises causing one or more other links of the multi-link direct links, comprising the multi-link off-channel direct link and being other than the primary multi-link direct link between the first non-AP MLD and the second non-AP MLD, to enter the active state for communication between the first non-AP MLD and the second non-AP MLD by:

transmitting, to the second non-AP MLD and without involving the AP MLD, a request to cause the one or more other links, of the multi-link direct links, comprising the multi-link off-channel direct link and being other than the primary multi-link direct link, to enter the active state; and receiving, from the second non-AP MLD and without involving the AP MLD, a confirmation for causing the one or more other links of the multi-link direct links, comprising the multi-link off-channel direct link and being other than the primary multi-link direct link, to enter the active state.

2. The method of claim 1, wherein the establishing of the multiple links as the multi-link direct links comprises negotiating with the second non-AP MLD to utilize one of the multi-link direct links as the primary multi-link direct link, and wherein the one or more other links of the multi-link direct links, comprising the multi-link off-channel direct link and being other than the primary multi-link direct link, are in a doze state.

3. The method of claim 2, wherein the communicating with the second non-AP MLD comprises causing the one or more other links of the multi-link direct links, comprising the multi-link off-channel direct link and being other than the primary multi-link direct link, to enter the active state in addition to the primary multi-link direct link.

4. The method of claim 1, wherein the request comprises a Target Wake Time (TWT) Setup Request frame, and wherein the confirmation comprises a TWT Setup Response frame.

5. The method of claim 3, wherein the one or more other links of the multi-link direct links, comprising the multi-link off-channel direct link and being other than the primary multi-link direct link, are caused to enter the active state during one or more Target Wake Time (TWT) service periods (SPs).

6. The method of claim 1, wherein the establishing of the multiple links as the multi-link direct links further comprises causing a link between the non-AP STA and an associated AP affiliated with the AP MLD to enter a doze state.

7. The method of claim 1, wherein the communicating with the second non-AP MLD comprises:

enabling an Enhanced Multi-Link Single-Radio (EMLSR) mode on at least one link of the multi-link direct links established between a non-AP station (STA) affiliated with the first non-AP MLD and an associated non-AP STA affiliated with the second non-AP MLD; and signaling to the AP MLD regarding the enabling of the EMLSR mode on the at least one link of the multi-link direct links.

8. The method of claim 7, wherein the enabling of the EMLSR mode on the at least one link of the multi-link direct links comprises causing a link between the non-AP STA and an associated AP affiliated with the AP MLD to enter a doze state.

9. A method, comprising:

establishing, by a processor of an access point (AP) multi-link device (MLD), multiple links as multi-link direct links in a multi-link association with a first non-AP MLD and a second non-AP MLD; and communicating, by the processor, with the first non-AP MLD and the second non-AP MLD over one or more links of the multi-link direct links in a multi-link direct link operation, wherein the multi-link direct links comprise at least:

a first link between a first non-AP station (STA) affiliated with the first non-AP MLD and a first AP affiliated with the AP MLD;

a second link between a second non-AP STA associated with the second non-AP MLD and the first AP affiliated with the AP MLD; and a primary multi-link direct link established between the first non-AP MLD and the second non-AP MLD among the multi-link direct links that is in an active state, and wherein the establishing of the multiple links as the multi-link direct links comprises establishing a multi-link off-channel direct link between the first non-AP STA affiliated with the first non-AP MLD and the second non-AP STA associated with the second non-AP MLD such that the first link and the second link enter a doze state responsive to the establishing of the multi-link off-channel direct link, and wherein the communicating comprises causing one or more other links of the multi-link direct links, comprising the multi-link off-channel direct link and being other than the primary multi-link direct link between the first non-AP MLD and the second non-AP MLD to enter the active state for communication between the first non-AP MLD and the second non-AP MLD by:

transmitting, to the second non-AP MLD and without involving the AP MLD, a request to cause the one or more other links of the multi-link direct links, comprising the multi-link off-channel direct link and being other than the primary multi-link direct link, to enter the active state; and receiving, from the second non-AP MLD and without involving the AP MLD, a confirmation for causing the one or more other links of the multi-link direct links, comprising the multi-link off-channel direct link and being other than the primary multi-link direct link, to enter the active state.

10. The method of claim 9, wherein the communicating comprises:

receiving a signaling from the first non-AP MLD regarding enabling an Enhanced Multi-Link Single-Radio (EMLSR) mode on at least one link of the multi-link direct links established between a non-AP station (STA) affiliated with the first non-AP MLD and an associated non-AP STA affiliated with the second non-AP MLD.

11. The method of claim 10, wherein a link among the multi-link direct links between the non-AP STA and an associated AP affiliated with the AP MLD enters a doze state responsive to the enabling of the EMLSR mode on the at least one link between the first non-AP MLD and the second non-AP MLD.

12. An apparatus, comprising:

a transceiver configured to communicate wirelessly; and a processor coupled to the transceiver and configured to perform, as a first non-access point (non-AP) multi-link device (MLD), operations comprising:

establishing, via the transceiver, multiple links as multi-link direct links with a second non-AP MLD;

maintaining, via the transceiver, a multi-link association with an AP MLD; and communicating, via the transceiver, with the second non-AP MLD over one or more links of the multi-link direct links in a multi-link direct link operation, wherein the multi-link direct links comprise at least:

a first link between a first non-AP station (STA) affiliated with the first non-AP MLD and a first AP affiliated with the AP MLD;

a second link between a second non-AP STA associated with the second non-AP MLD and the first AP affiliated with the AP MLD; and a primary multi-link direct link established between the first non-AP MLD and the second non-AP MLD among the multi-link direct links that is in an active state, and wherein the establishing of the multiple links as the multi-link direct links comprises establishing a multi-link off-channel direct link between the first non-AP STA affiliated with the first non-AP MLD and the second non-AP STA associated with the second non-AP MLD such that the first link and the second link enter a doze state responsive to the establishing of the multi-link off-channel direct link, and wherein the communicating comprises causing one or more other links of the multi-link direct links, comprising the multi-link off-channel direct link and being other than the primary multi-link direct link between the first non-AP MLD and the second non-AP MLD, to enter the active state for communication between the first non-AP MLD and the second non-AP MLD by:

transmitting, to the second non-AP MLD and without involving the AP MLD, a request to cause the one or more other links-of the multi-link direct links, comprising the multi-link off-channel direct link and being other than the primary multi-link direct link, to enter the active state; and receiving, from the second non-AP MLD and without involving the AP MLD, a confirmation for causing the one or more other links of the multi-link direct links, comprising the multi-link off-channel direct link and being other than the primary multi-link direct link, to enter the active state.

13. The apparatus of claim 12, wherein the establishing of the multiple links as the multi-link direct links comprises negotiating with the second non-AP MLD to utilize one of the multi-link direct links as the primary multi-link direct link, and wherein the one or more other links of the multi-link direct links, comprising the multi-link off-channel direct link and being other than the primary multi-link direct link, are in a doze state.

14. The apparatus of claim 13, wherein the communicating with the second non-AP MLD comprises causing the one or more other links of the multi-link direct links, comprising the multi-link off-channel direct link and being other than the primary multi-link direct link, to enter the active state in addition to the primary multi-link direct link.

15. The apparatus of claim 14, wherein the request comprises a Target Wake Time (TWT) Setup Request frame, and wherein the confirmation comprises a TWT Setup Response frame, and wherein the one or more other links of the multi-link direct links, comprising the multi-link off-channel direct link and being other than the primary multi-link direct link, are caused to enter the active state during one or more Target Wake Time (TWT) service periods (SPs).

16. The apparatus of claim 12, wherein the communicating with the second non-AP MLD comprises:

enabling an Enhanced Multi-Link Single-Radio (EMLSR) mode on at least one link of the multi-link direct links established between a non-AP station (STA) affiliated with the first non-AP MLD and an associated non-AP STA affiliated with the second non-AP MLD; and signaling to the AP MLD regarding the enabling of the EMLSR mode on the at least one link of the multi-link direct links, wherein the enabling of the EMLSR mode on the at least one link comprises causing a link between the non-AP STA and an associated AP affiliated with the AP MLD to enter a doze state.

* * * * *